United States Patent
Chien et al.

(10) Patent No.: US 10,764,546 B2
(45) Date of Patent: Sep. 1, 2020

(54) PROJECTION DEVICE AND METHOD FOR GENERATING ADJUSTMENT GRIDLINES

(71) Applicant: Coretronic Corporation, Hsin-Chu (TW)

(72) Inventors: Chun-Lin Chien, Hsin-Chu (TW); Yu-Kuan Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/744,099

(22) Filed: Jan. 15, 2020

(65) Prior Publication Data
US 2020/0244935 A1    Jul. 30, 2020

(30) Foreign Application Priority Data
Jan. 30, 2019    (CN) .......................... 2019 1 0091624

(51) Int. Cl.
*H04N 9/31*    (2006.01)
(52) U.S. Cl.
CPC ................................ *H04N 9/3185* (2013.01)
(58) Field of Classification Search
CPC ...... H04N 9/3185; H04N 9/3197; H04N 9/31; H04N 9/28
USPC .......................... 348/744–747, 806; 382/275
See application file for complete search history.

(56) References Cited

U.S. PATENT DOCUMENTS

| 6,583,814 B1 * | 6/2003 | Runtze ................... H04N 9/28 348/181 |
| 2013/0083058 A1 | 4/2013 | Yoshimura |

FOREIGN PATENT DOCUMENTS

| CN | 102158674 | 8/2011 |
| CN | 104038690 | 9/2014 |
| CN | 105376540 | 3/2016 |
| TW | 201249204 | 12/2012 |

* cited by examiner

*Primary Examiner* — Sherrie Hsia
(74) *Attorney, Agent, or Firm* — JCIPRNET

(57) ABSTRACT

A projection device having a signal input unit, an image signal generating unit, an image adjustment unit, a control unit and a projection unit is provided. The signal input unit receives an external signal. The image signal generating unit generates an image signal. The image adjustment unit generates image adjustment gridlines according to the signal source. The control unit detects the signal input unit, and when the signal input unit does not receive the external signal, the control unit controls the image signal generating unit to generate the image signal to serve as the signal source. The projection unit projects the signal source and the image adjustment gridlines onto a projection plane. The projection device and the method for generating adjustment gridlines of the invention are still capable of generating the image adjustment gridlines in case that an input signal source does not exist.

12 Claims, 3 Drawing Sheets

PROJECTION DEVICE AND METHOD FOR GENERATING ADJUSTMENT GRIDLINES

CROSS-REFERENCE TO RELATED APPLICATION

This application claims the priority benefit of China application serial no. 201910091624.1, filed on Jan. 30, 2019. The entirety of the above-mentioned patent application is hereby incorporated by reference herein and made a part of this specification.

BACKGROUND

Technical Field

The invention relates to a projection technique, and particularly relates to a projection device and a method for generating adjustment gridlines.

Description of Related Art

In order to maintain good projection quality in different projection environments, image adjustment function is a necessary function in projection devices. In the existing projection devices, the image adjustment function is generally implemented by using a warping chip to output image adjustment gridlines to perform warping adjustment on an image according to adjustment grid points. However, the image adjustment gridlines is created based on a clock source and a signal of a signal source input to the warping chip, namely, if the input signal source does not exist, the warping chip cannot produce the image adjustment gridlines.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a projection device and a method for generating adjustment gridlines, where the projection device is still capable of producing image adjustment gridlines in case that an input signal source does not exist.

In order to achieve one or a portion of or all of the objects or other objects, an embodiment of the invention provides a projection device. The projection device has a signal input unit, an image signal generating unit, an image adjustment unit, a control unit and a projection unit. The signal input unit is configured to receive an external signal. The image signal generating unit is configured to generate an image signal. The image adjustment unit is connected to the signal input unit and the image signal generating unit, and generates image adjustment gridlines corresponding to a signal source according to the signal source. The control unit is connected to the signal input unit, the image signal generating unit and the image adjustment unit. Moreover, the control unit is configured to detect the signal input unit, and when the signal input unit does not receive the external signal, the control unit controls the image signal generating unit to generate the image signal to serve as the signal source. The projection unit is connected to the image adjustment unit and the control unit. The projection unit projects the signal source and the image adjustment gridlines onto a projection plane.

In order to achieve one or a portion of or all of the objects or other objects, an embodiment of the invention provides a method for generating adjustment gridlines, which is adapted to a projection device, where the projection device has a signal input unit and an image signal generating unit, and the method for generating adjustment gridlines has following steps: detecting whether the signal input unit receives an external signal; controlling the image signal generating unit to generate an image signal to serve as a signal source when detecting that the signal input unit does not receive the external signal; generating image adjustment gridlines corresponding to the signal source according to the signal source; and projecting the signal source and the image adjustment gridlines onto a projection plane.

According to the above description, the projection device and the method for generating adjustment gridlines of the invention are capable of generating the image adjustment gridlines in case that the input signal source does not exist. In this way, a user may adjust the image at any time without being limited by the input signal source.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
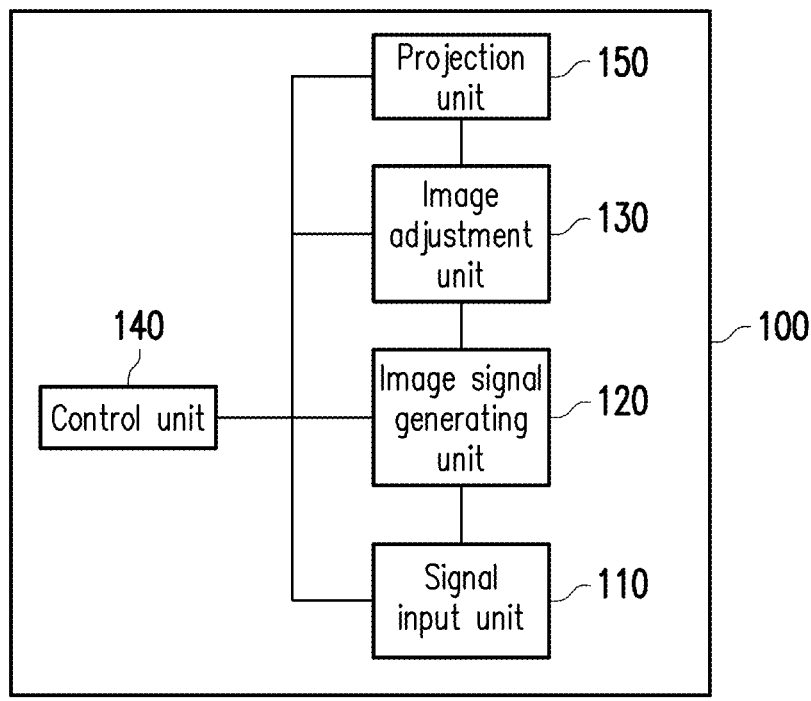
FIG. 1 is a schematic diagram of a projection device according to an embodiment of the invention.

FIG. 1 is a schematic diagram of a projection device according to an embodiment of the invention. Referring to FIG. 1, in the embodiment, the projection device 100 has a signal input unit 110, an image signal generating unit 120, an image adjustment unit 130, a control unit 140 and a projection unit 150.

The single input unit 110 is configured to receive an external signal. For example, the signal input unit 110 is a connection interface for receiving digital signals, for example, an RS-232 interface, a Universal Serial Bus (USB), a display data channel command interface, an RJ45 interface, a High Definition Multimedia Interface (HDMI), a Digital Visual Interface (DVI), etc., or a wireless receiving device, for example, a Wireless Fidelity (WiFi) interface or Bluetooth interface, or the signal input unit 110 receives an analog signal, for example, an S terminal, an AV terminal, a Video Graphics Array (VGA) connector, etc., or the signal input unit 110 may be a combination of the above interfaces, which is not limited by the invention.

The image signal generating unit 120 is configured to generate an image signal. In an embodiment of the invention, the image signal generating unit 120 is connected to the input unit 110, and generates the image signal according to the resolution interface. For example, when the resolution information is 1080p, the image signal generating unit 120 generates a signal source of 1080p. In a different embodiment of the invention, the image signal generating unit 120 may also generate the image signal according to other image format (for example, a frame rate, etc.), which is not limited by the invention. Besides, in an embodiment of the invention, the image signal generating unit 120 is implemented by a scaler integrated circuit (Scaler IC), but the invention is not limited thereto.

The image adjustment unit 130 is connected to the signal input unit 110 and the image signal generating unit 120, and is configured to generate image adjustment gridlines corresponding to a signal source according to the signal source. The signal source may be frame data or image data. In other words, the external signal received by the signal input unit 110 or the image signal generated by the image signal generating unit 120 may all serve one of the signal sources of the image adjustment unit 130.

Moreover, when the image adjustment unit 130 generates the image adjustment gridlines, each grid point of the image adjustment gridlines is a control point. Moreover, when the user performs an adjustment operation such as a pulling up/down operation on each of the control points, the image adjustment unit 130 may adjust the image according to the user's operation on the control points. In an embodiment of the invention, the image adjustment unit 130 is, for example, implemented by a warping IC, but the invention is not limited thereto.

The control unit 140 is connected to the signal input unit 110, the image signal generating unit 120 and the image adjustment unit 130. The control unit 140 is configured to control various components of the projection device 100 to implement various functions of the projection device 100. Particularly, the control unit 140 may detect whether the signal input unit 110 receives the external signal, and accordingly control the image signal generating unit 120 to generate the image signal to serve as the signal source.

The control unit 140 is configured to detect the signal input unit 110, and when the signal input unit 110 receives the external signal, the control unit 140 controls the image signal generating unit 120 not to generate the image signal, and takes the external signal as the signal source. Details of how the control unit 140 interacts with various components to execute the method for generating the adjustment gridlines are described later. In an embodiment of the invention, the control unit 140 is, for example, a Central Processing Unit (CPU), a microprocessor, a Digital Signal Processor (DSP), a programmable controller, a Programmable Logic Device (PLD) or other similar device or a combination of the above devices, which is not limited by the invention.

The projection unit 150 is connected to the image adjustment unit 130 and the control unit 140, and is configured to project the signal source and the image adjustment gridlines onto a projection plane. The projection unit 150, for example, has a spatial light modulator, and the spatial light modulator has a Digital Micromirror Device (DMD), but the invention is not limited thereto, and a transmissive spatial light modulator may also be adopted, for example, a transparent liquid crystal panel. Moreover, according to different ways of inputting a control signal, the spatial light modulator is, for example, an Optically Addressed Spatial Light Modulator (OASLM) or an Electrically Addressed Spatial Light Modulator (EASLM), and the pattern and type of the spatial light modulator are not limited by the invention.

Figure 2:
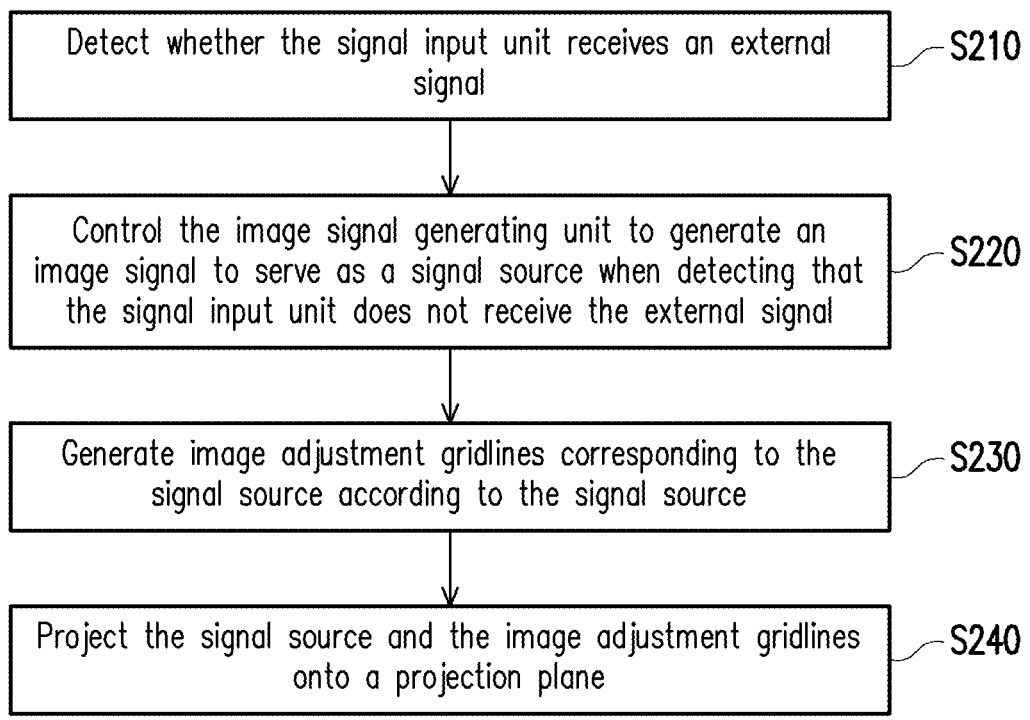
FIG. 2 is a flowchart illustrating a method for generating adjustment gridlines according to an embodiment of the invention.

FIG. 2 is a flowchart illustrating a method for generating adjustment gridlines according to an embodiment of the invention. The method for generating adjustment gridlines of the embodiment is at least adapted to the projection device 100 of the embodiment of FIG. 1, so that operation details of the projection device 100 and execution details of the method for generating adjustment gridlines are described below with reference of FIG. 1 and FIG. 2.

In a step S210, the control unit 140 detects whether the signal input unit 110 receives the external signal. In an embodiment of the invention, the control unit 140 receives an image adjusting instruction, and enables the method for generating adjustment gridlines according to the image adjusting instruction to execute the step S210. Alternatively, the control unit 140 may also preset to execute the method for generating adjustment gridlines at each booting, but the invention is not limited thereto.

In a step S220, when detecting that the signal input unit 110 does not receive the external signal, the control unit 140 controls the image signal generating unit 120 to generate an image signal to serve as a signal source. In an embodiment of the invention, the control unit 140 may detect resolution information of the projection unit 150, alternatively, the resolution information of the projection unit 150 is preset in the control unit 140. In this way, while the control unit 140 sends a control signal to control the image signal generating unit 120 to generate the image signal, the control unit 140 also transmits the resolution information to the image signal generating unit 120, and the image signal generating unit 120 generates the image signal according to the resolution information.

It should be noted that when the control unit 140 detects that the signal input unit 110 receives the external signal, since the external signal may serve as the signal source input to image adjustment unit 130, the control unit 140 does not control the image signal generating unit 130 to generate the image signal, but transmits the external signal to the image adjustment unit 130 through the image signal generating unit 120, such that the external signal serves as the signal source.

In a step S230, the image adjustment unit 130 generates the image adjustment gridlines corresponding to the signal source according to the signal source. In an embodiment of the invention, the image adjustment unit 130 logically and equally divides a length and a width of an image corresponding to the signal source, so as to form the image adjustment gridlines. In an embodiment of the invention, the image adjustment unit 130 respectively divides a long side and a wide side of the image corresponding to the signal source into n equal parts, where n is an integer greater than 0. For example, the image adjustment unit 130 may respectively divide the long side and the wide side of the image corresponding to the signal source into 8 equal parts, so as to form 64 sub-blocks. In other embodiments of the invention, the image adjustment unit 130 may respectively divide the long side and the wide side of the image into different parts. For example, the image adjustment unit 130 may respectively divide the long side of the image corresponding to the signal source into 8 equal parts, and divide the wide side into 7 equal parts, so as to form 56 sub-blocks. In still another embodiment of the invention, the user may input other different division options through the projection device 100, so as to adjust the number of the sub-blocks. In this way, the image adjustment unit 130 may provide the user to change a fineness of image adjustment through different division settings.

In a step S240, the projection unit 150 projects the signal source and the image adjustment gridlines onto a projection plane. Moreover, after the image adjustment unit 130 completes the image adjustment, the image adjustment unit 130 or the control unit 140 may record a corresponding parameter for adjusting the image, and other signal source may be projected according to such parameter. The parameter is, for example, an image resolution, etc.

Figure 3A:
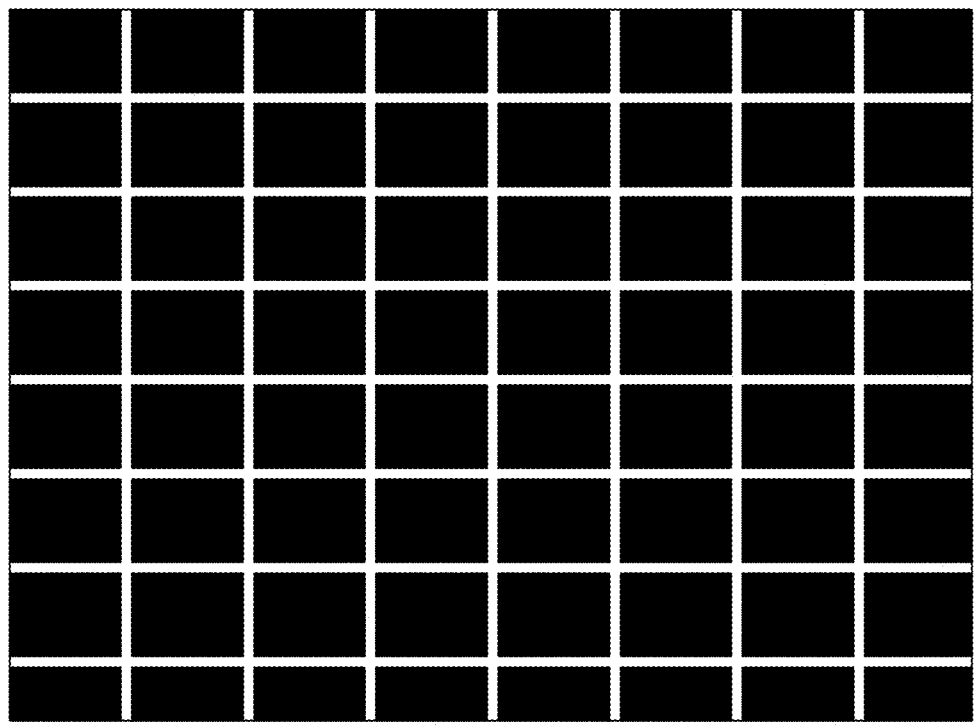
FIG. 3A is a schematic diagram of a projected image according to an embodiment of the invention.

It should be noted that in the embodiment of the invention, the content of the image signal is not limited. For example, referring to FIG. 3A, FIG. 3A is a schematic diagram of a projected image according to an embodiment of the invention. In FIG. 3A, the signal source is generated by the image signal generating unit 120, and the signal source is projected onto the projection plane through the image adjustment unit 130 and the projection unit 150. In this case, the corresponding content of the image signal is a fully black screen, and the image adjustment gridlines are displayed at the same time. In other embodiments of the invention, the corresponding content of the image signal may also be a fully white screen or a random pattern, which is not limited by the invention. The image adjustment gridlines and the corresponding content of the image signal may present contrastive colors, such that the user may easily recognize a position of the image adjustment gridlines.

Figure 3B:
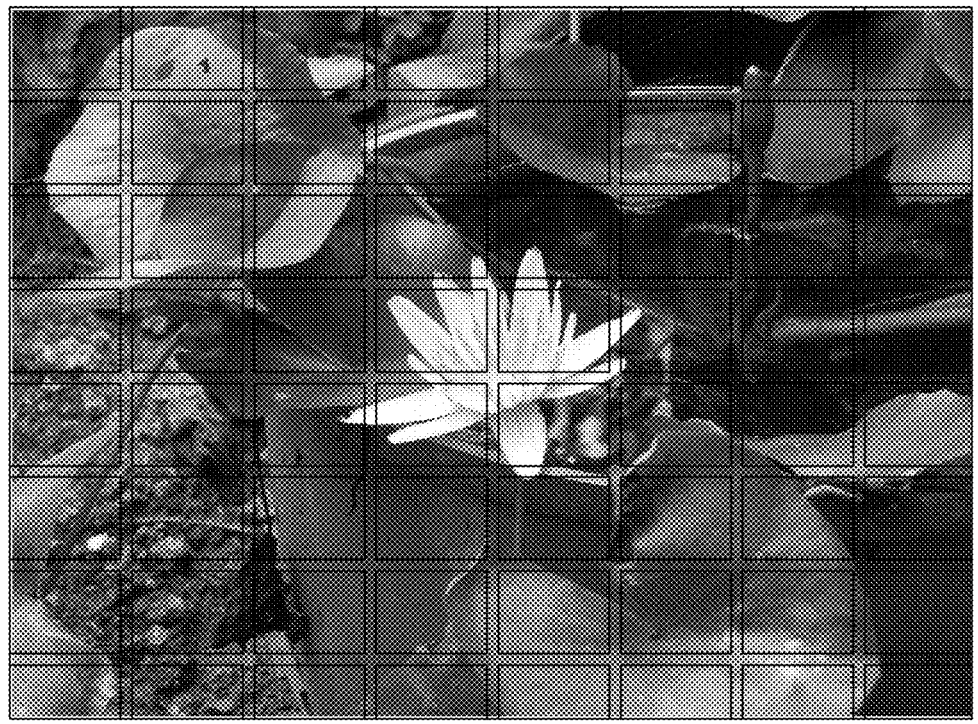
FIG. 3B is a schematic diagram of another projected image according to an embodiment of the invention.

FIG. 3B is a schematic diagram of another projected image according to an embodiment of the invention. In FIG. 3B, signal source is an external signal received by the signal input unit 110, and the signal source is projected onto the projection plane through the image adjustment unit 130 and the projection unit 150. In this case, the corresponding content of the external signal may be different according to different signal content, which is not limited by the invention.

Figure 4:
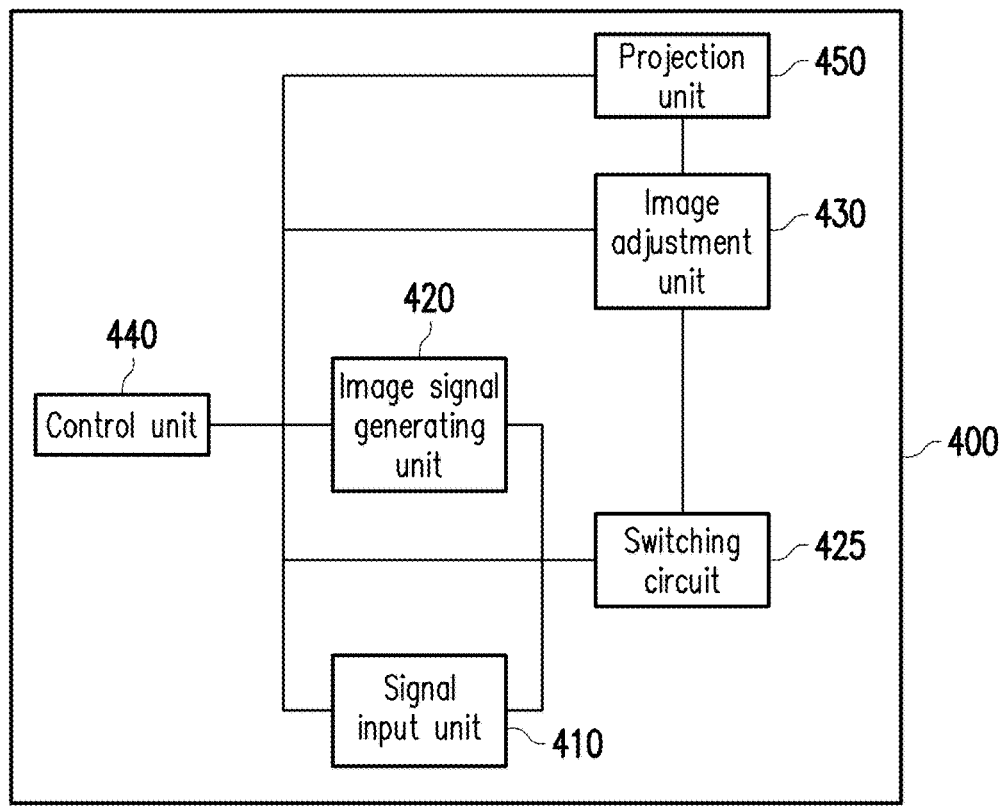
FIG. 4 is a schematic diagram of a projection device according to another embodiment of the invention.

FIG. 4 is a schematic diagram of a projection device according to another embodiment of the invention. In the embodiment, the projection device 400 has a signal input unit 410, an image signal generating unit 420, a switching circuit 425, an image adjustment unit 430, a control unit 440 and a projection unit 450.

In the embodiment, functions and applicable hardware of the signal input unit 410, the image signal generating unit 420, the image adjustment unit 430, the control unit 440 and the projection unit 450 are all the same with that of the projection device 100 of FIG. 1, and details thereof are not repeated. The difference of the two embodiments lies in the switching circuit 425, so that the projection device 400 and the projection device 100 shown in the embodiment of FIG. 1 are slightly different.

To be specific, the switching circuit 425 is respectively connected to the signal input unit 410 and the image signal generating unit 420, so as to implement signal switching between the signal input unit 410 and the image signal generating unit 420. If a path is formed between the switching circuit 425 and the signal input unit 410, and an open circuit is formed between the switching circuit 425 and the image signal generating unit 420, the external signal received by the signal input unit 410 is transmitted to the image adjustment unit 430 from the signal input unit 410 through the switching circuit 425, so that the external signal serves as the signal source. Conversely, if the open circuit is formed between the switching circuit 425 and the signal input unit 410, and a path is formed between the switching circuit 425 and the image signal generating unit 420, the image signal generated by the image signal generating unit 420 is transmitted to the image adjustment unit 430 through the switching circuit 425, so that the image signal serves as the signal source. The switching circuit 425 may be implemented by any circuit or selected with a switching function, which is not repeated.

Figure 5:
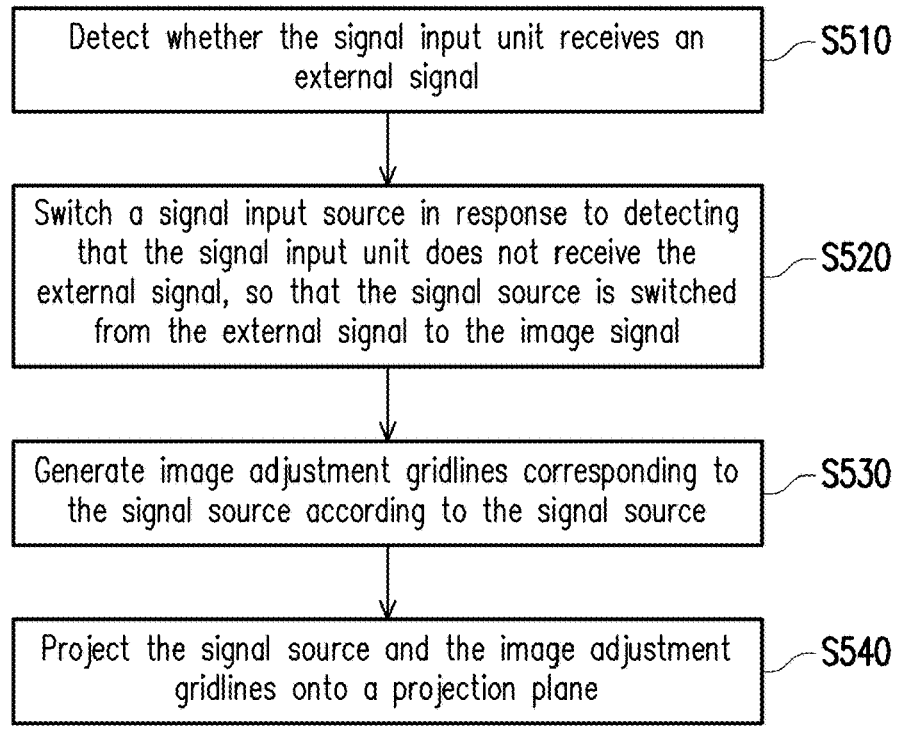
FIG. 5 is a flowchart illustrating a method for generating adjustment gridlines according to another embodiment of the invention.

FIG. 5 is a flowchart illustrating a method for generating adjustment gridlines according to another embodiment of the invention. The method for generating adjustment gridlines of the embodiment is at least adapted to the projection device 400 of the embodiment of FIG. 4, so that operation details of the projection device 100 and execution details of the method for generating adjustment gridlines are described below with reference of FIG. 4 and FIG. 5.

In a step S510, the control unit 440 detects whether the signal input unit 410 receives an external signal. Since the step S510 is the same to the step S210, details of the step S510 are not repeated.

In a step S520, when the control unit 440 detects that the signal input unit 410 does not receive the external signal, the control unit 440 controls the switching circuit 425 to switch a signal input source, so that the signal source is switched from the external signal received by the signal input unit 410 to the image signal generated by the image signal generating unit 420. Namely, the control unit 440 may control the switching circuit 425 to form the path between the switching circuit 425 and the image signal generating unit 420.

Conversely, when the control unit 440 detects that the signal input unit 410 receives the external signal, the control unit 440 controls the switching circuit 425 to switch the signal input source, so that the signal source is switched to the external signal received by the signal input unit 410.

In a step S530, the image adjustment unit 430 generates the image adjustment gridlines corresponding to the signal source according to the signal source. In a step S540, the projection unit 450 projects the signal source and the image adjustment gridlines onto a projection plane. The steps S530 and S540 are the same to the steps S230 and S240, so that details thereof are not repeated.

In summary, in the projection device and the method for generating adjustment gridlines of the invention, when the input signal source does not exist, the image signal generating unit may generate a signal source, and transmit the same to the image adjustment unit. The image adjustment unit may generate the image adjustment gridlines according to the signal source generated by the image signal generating unit. In this way, the user may adjust the image at any time without being limited by the input signal source.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
    a signal input unit, configured to receive an external signal;
    an image signal generating unit, configured to generate an image signal;
    an image adjustment unit, connected to the signal input unit and the image signal generating unit, and generating image adjustment gridlines corresponding to a signal source according to the signal source;
    a control unit, connected to the signal input unit, the image signal generating unit and the image adjustment unit, wherein the control unit is configured to detect the signal input unit, and when the signal input unit does not receive the external signal, the control unit controls the image signal generating unit to generate the image signal to serve as the signal source; and
    a projection unit, connected to the image adjustment unit and the control unit, and projecting the signal source and the image adjustment gridlines onto a projection plane.

2. The projection device as claimed in claim 1, wherein the control unit does not control the image signal generating unit to generate the image signal when detecting that the signal input unit receives the external signal, and the external signal is transmitted to the image adjustment unit through the image signal generating unit to serve as the signal source.

3. The projection device as claimed in claim 1, wherein when the control unit receives an image adjusting instruction, the control unit detects whether the signal input unit receives the external signal according to the image adjusting instruction.

4. The projection device as claimed in claim 1, wherein the image signal generating unit generates the image signal according to resolution information.

5. The projection device as claimed in claim 1, further comprising:
    a switching circuit, connected to the control unit, the signal input unit and the image signal generating unit, and receiving the signal source, wherein when the control unit detects that the signal input unit does not receive the external signal, the control unit controls the switching circuit to switch a signal input source, so that the signal source is switched from the external signal to the image signal.

6. The projection device as claimed in claim 1, wherein the control unit is configured to detect the signal input unit, and when the signal input unit receives the external signal, the control unit controls the image signal generating unit not to generate the image signal, and takes the external signal as the signal source.

7. A method for generating adjustment gridlines, adapted to a projection device, wherein the projection device comprises a signal input unit and an image signal generating unit, wherein the method comprises:
    detecting whether the signal input unit receives an external signal;
    controlling the image signal generating unit to generate an image signal to serve as a signal source when detecting that the signal input unit does not receive the external signal;
    generating image adjustment gridlines corresponding to the signal source according to the signal source; and
    projecting the signal source and the image adjustment gridlines onto a projection plane.

8. The method as claimed in claim 7, further comprising:
    uncontrolling the image signal generating unit to generate the image signal when detecting that the signal input unit receives the external signal, so that the external signal serves as the signal source.

9. The method as claimed in claim 7, wherein before the step of detecting whether the signal input unit receives the external signal, the method further comprises:
    receiving an image adjusting instruction, and
    detecting whether the signal input unit receives the external signal according to the image adjusting instruction.

10. The method as claimed in claim 7, wherein the image signal is generated according to resolution information.

11. The method as claimed in claim 7, further comprising:
    switching a signal input source when detecting that the signal input unit does not receive the external signal, so that the signal source is switched from the external signal to the image signal.

12. The method as claimed in claim 7, further comprising:
    controlling the image signal generating unit not to generate the image signal when detecting that the signal input unit receives the external signal, and taking the external signal as the signal source.

\* \* \* \* \*